Jan. 28, 1930.  M. SCHWOB ET AL  1,744,809
UNIVERSAL AND AUTOMATIC MACHINE TOOL
Filed Aug. 20, 1925  10 Sheets-Sheet 5
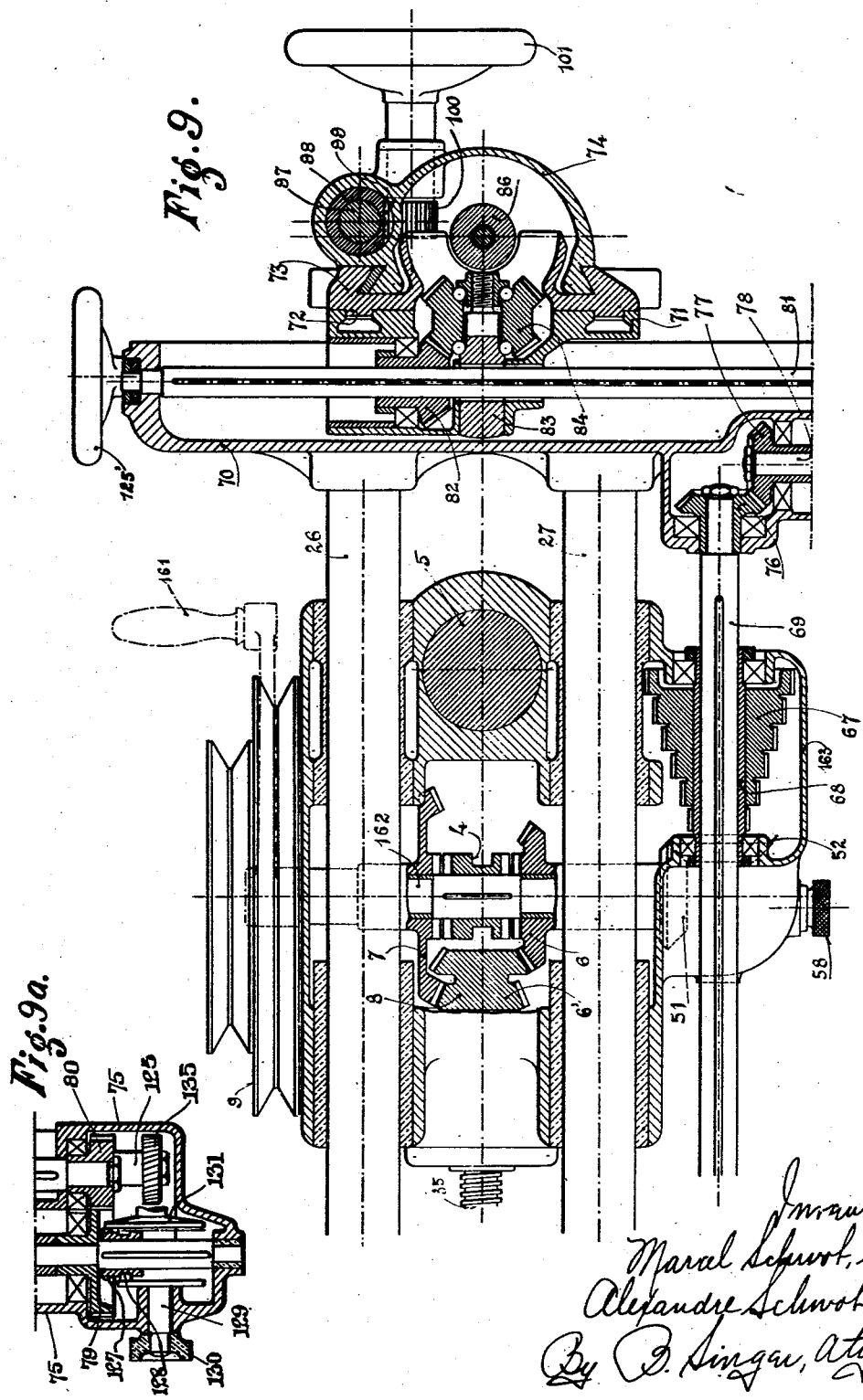

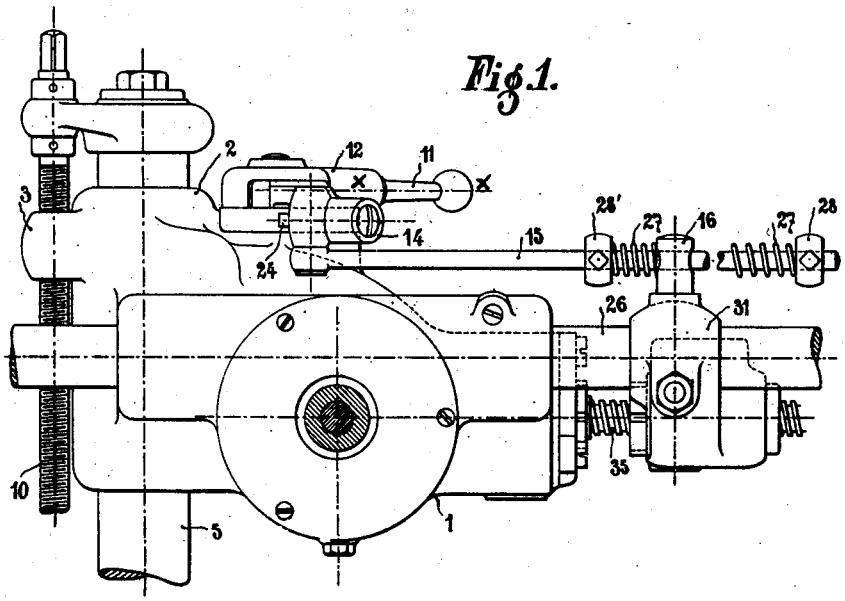

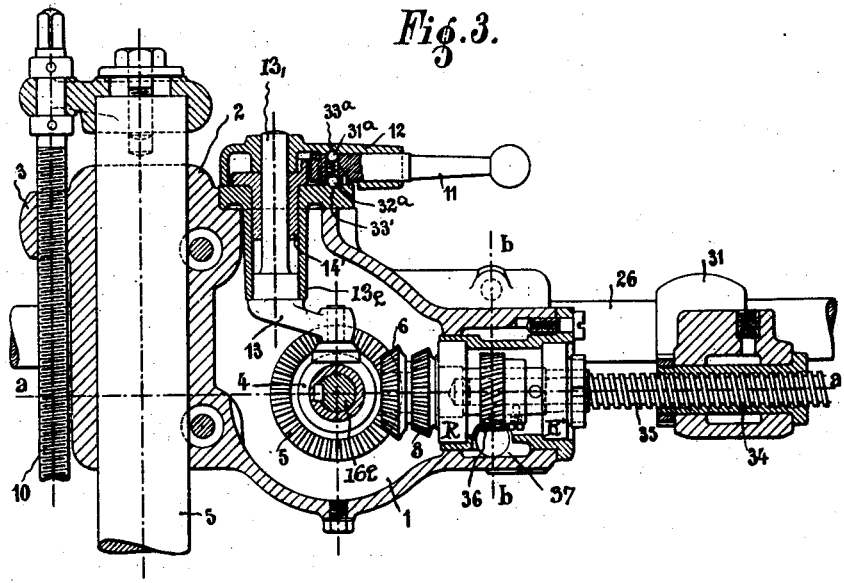
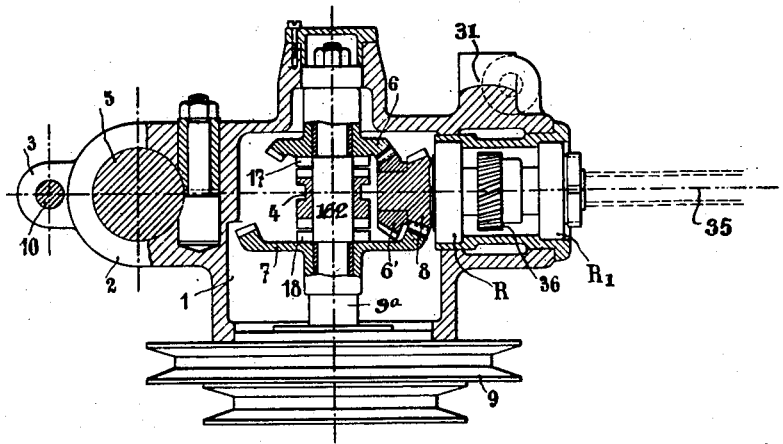

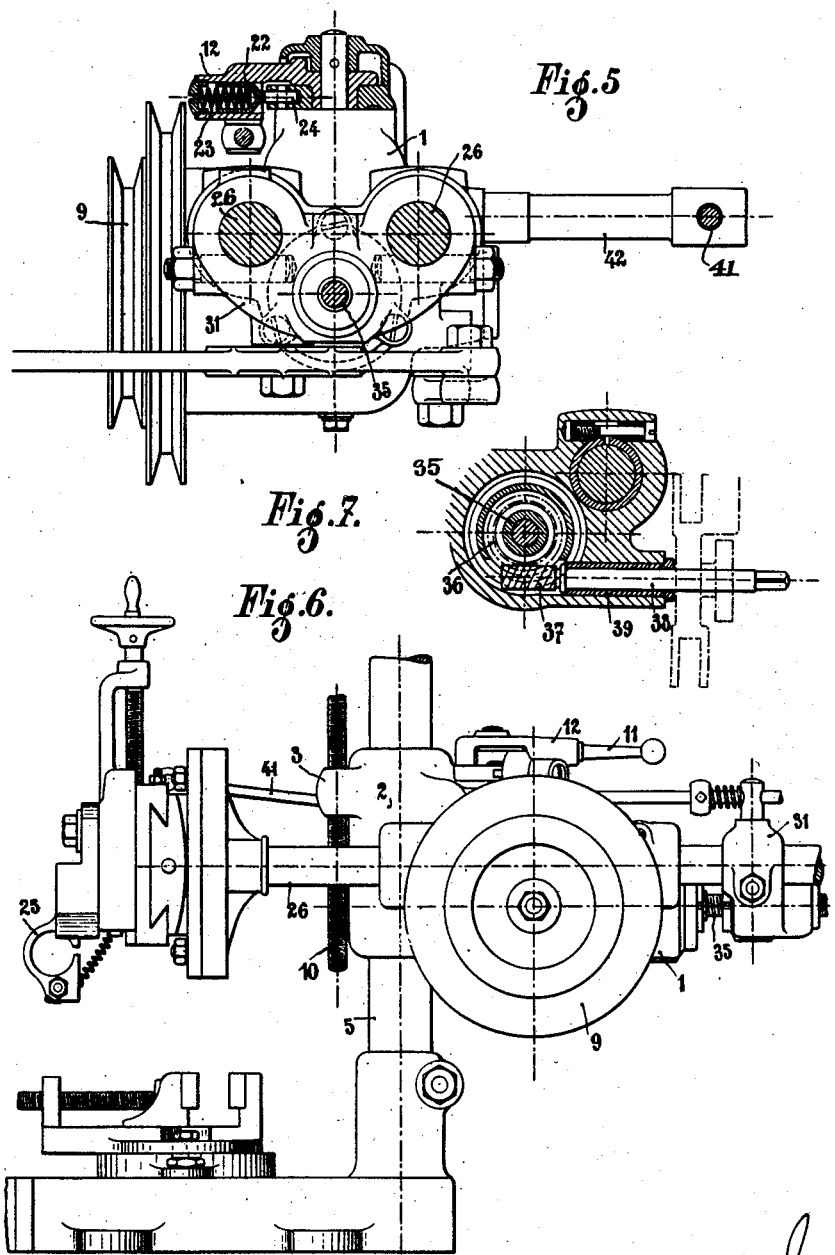

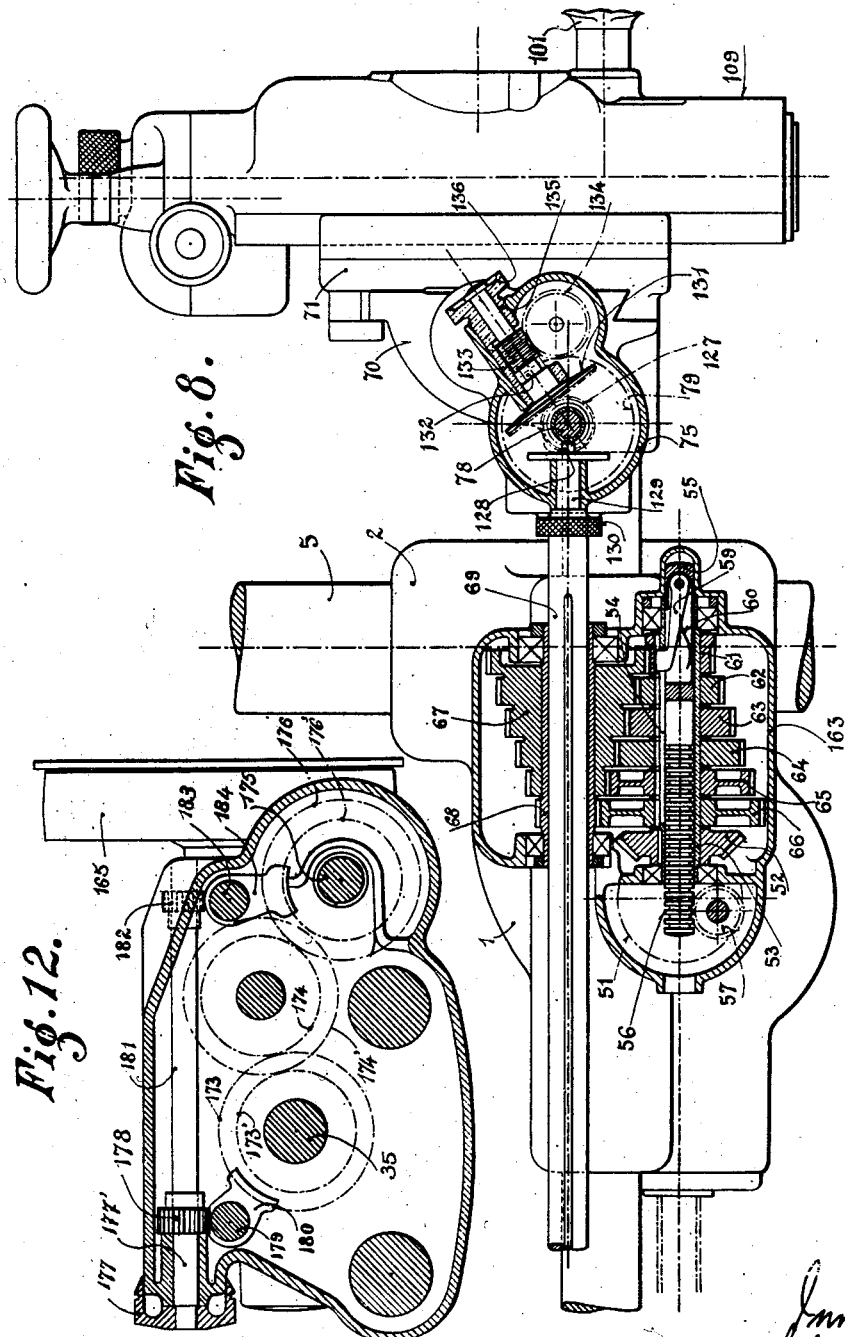

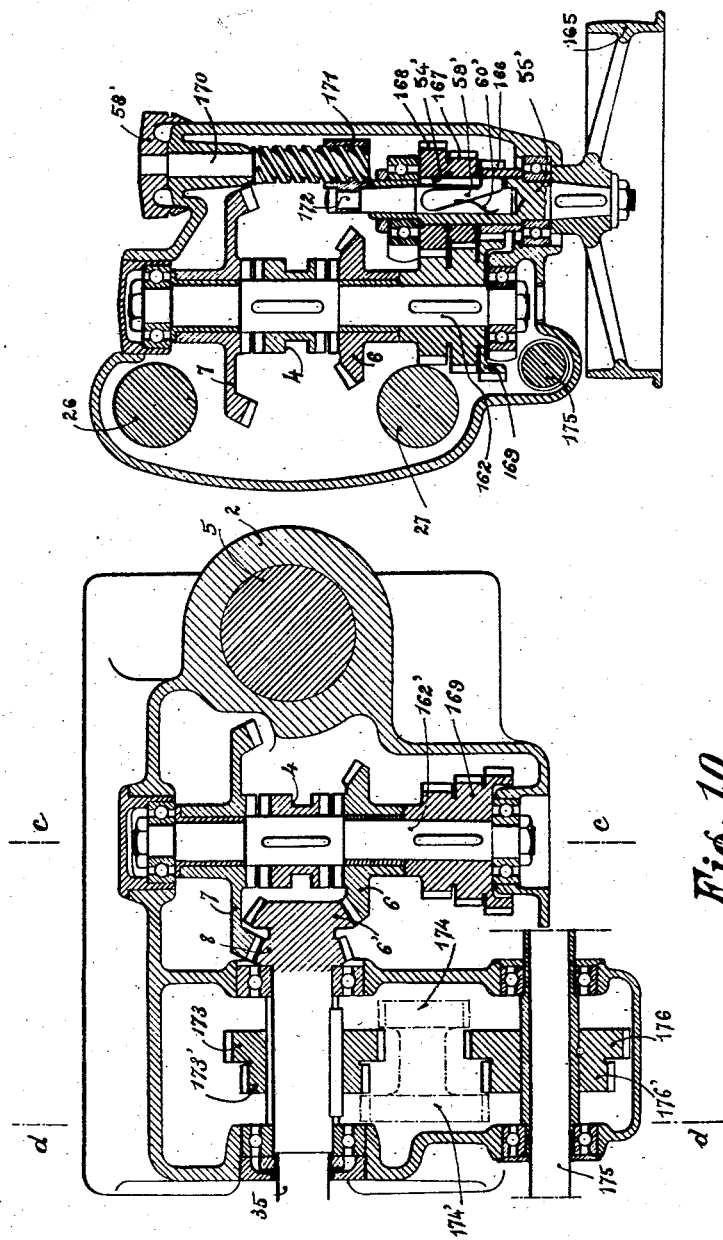

Jan. 28, 1930.  M. SCHWOB ET AL  1,744,809
UNIVERSAL AND AUTOMATIC MACHINE TOOL
Filed Aug. 20, 1925   10 Sheets-Sheet 10

Inventors
Marcel Schwob and
Alexandre Schwob
by B Singer Atty

Patented Jan. 28, 1930

1,744,809

UNITED STATES PATENT OFFICE

MARCEL SCHWOB AND ALEXANDRE SCHWOB, OF PARIS, FRANCE

UNIVERSAL AND AUTOMATIC MACHINE TOOL

Application filed August 20, 1925, Serial No. 51,410, and in France August 7, 1925.

In Letters Patent of the United States No. 1,633,714, granted to us June 28, 1927, an automatic and universal machine tool is described which permits the execution of all shop work of mechanical kind, such as planing, shaping, milling, boring, grinding, cutting, mortising and so on.

It is the object of the present invention to provide essential improvements with regard to the machine known.

In this known machine, a lever is provided for all controlling by hand and more especially for all surface working, the said lever imparting directly a longitudinal motion to the tool; the other movements such as the transverse displacements are operated by means of mechanisms emanating from the longitudinal motion, and described already.

For working with a motor, a substitution is provided for the hand-lever, consisting in a slotted disk with a connecting rod having one extremity attached to said disk, whilst the other extremity is attached to the element to be controlled, instead of the hand-lever.

The present invention has the following purpose: to replace the device intended for shaping in the prior U. S. A. patent application No. 643,699 by another device permitting:

1. To produce automatically the coupling and uncoupling at the end of the tool-stroke, in a manner to ensure its continuous to and fro-motion and to give to this tool cutting speeds suitable for the work to be done as well as accelerated speeds for its backward stroke.

2. To permit coupling and uncoupling by and, at any point of the machine, independently of the automatic uncoupling movement or to provoke by and its automatic uncoupling at the end of the stroke.

3. To obtain automatically transverse displacements of the tool.

4. To group and to enclose the steering members in a single casing mounted on the column of the machine and forming a support for the guidance of the tool-carrying arm, this angle block device forming an indispensable complement of the machine described in the prior specification No. 643,699.

Another purpose is to substitute for the two heads carrying the tool as described in the specification No. 643,699, one single tool-carrying head enclosing all elements necessary for the performance of the operations indicated above.

This tool-carrying head transmits its working to the shaping device, such working comprising the change of speed the elements of this changing device being combined with those of the said device and enclosed in the same casing.

C. to add a hand-control by means of a crank permitting to effect all indicated operations while utilizing the mechanisms for controlling the tool-head by a motor.

D. to regulate by hand and to produce the advance of each tool, independently of their automatic advances.

In order that the invention may be clearly understood and readily carried into effect, reference is made to the accompanying drawings, in which:

Figure 1 is an elevation of the single block device in its highest position, the said device being shown mounted on the column of the machine.

Figure 2 is a plan of Figure 1.

Figure 3 is a longitudinal central sectional elevation.

Figure 4 is a horizontal section on the line a—a of Figure 3.

Figure 5 is an end view partly in section of Figure 1 looking in the direction of the arrow Figure 1.

Figure 6 drawn to a reduced scale shews the single block device applied to the machine as in said prior patent.

Figure 7 is a sectional detail on the line b—b of Figure 3.

Figure 8, is an elevation of a modified executional form of the single block device mounted on the column of the machine and of the tool-head, shewing in section the speed-box for controlling the speed of the transmission of the movement, and also shewing the mechanism for controlling the automatic transverse motion of the tool-head.

Figure 9 is a sectional plan of Figure 8.

Figure 9ª is a view of a portion of the gearing between shafts 78 and 81 shown in Figure 9.

Figure 10 is a sectional plan analogous to Figure 9 but shewing a modified arrangement for the transmission of motion.

Figure 11 is a vertical section on the line $c$—$c$ of Figure 10.

Figure 12 is a vertical end section on the line $d$—$d$ of Figure 10.

Figure 13:
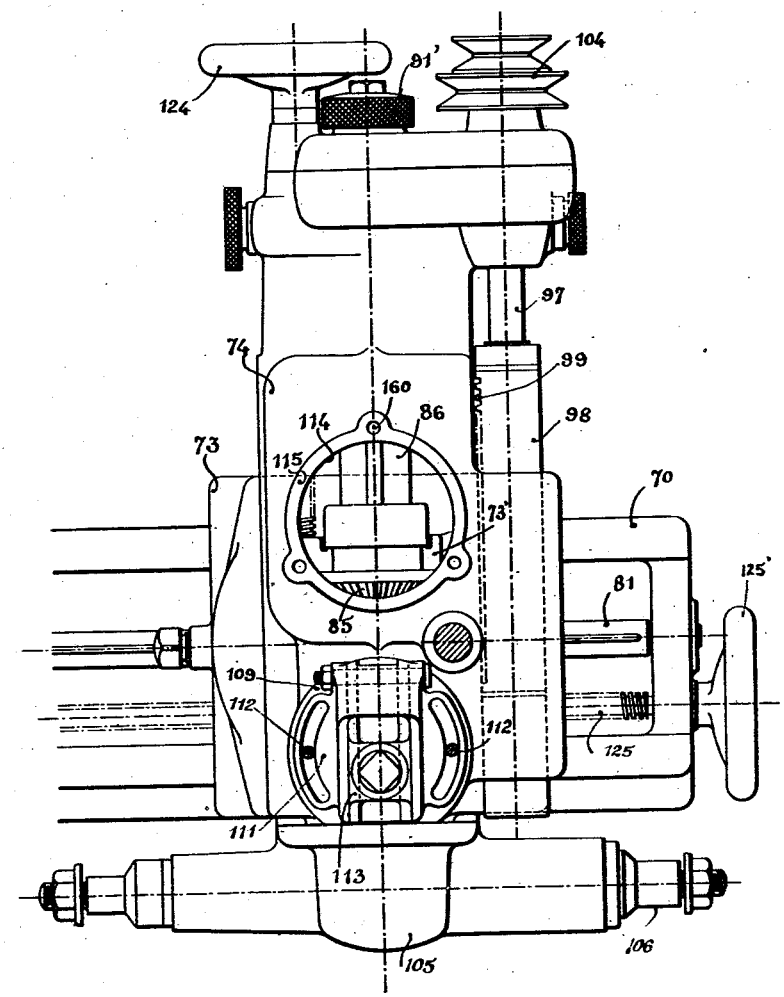

Figure 13 is a front elevation of the tool-head.

Figure 14 is a vertical section of the head shown in Figure 13.

Figure 15 is a sectional plan on the line $e$—$e$ of Figure 14.

Figure 16 is an end view, in vertical section, on the line $f$—$f$ of Figure 15.

Figure 17A:
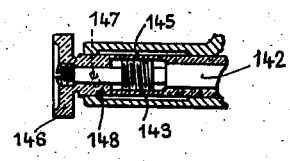

Figure 17 is a vertical section on the line $g$—$g$ of Figure 15.

Figure 17ª is a section of the left hand portion of Figure 17.

Figure 18:
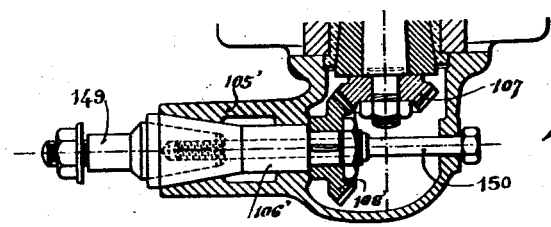

Figure 18 shews in section a modified construction form of the horizontal shaft shewn in section.

Figure 19:
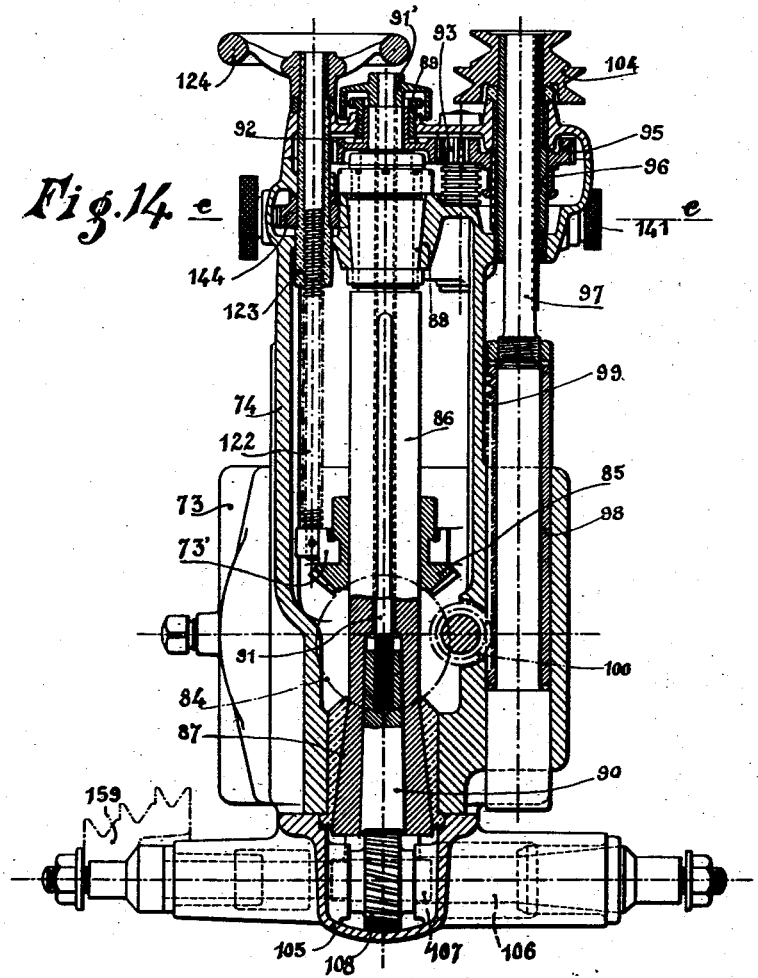

Figure 19 shews the method of mounting and the means for controlling boring device.

Figure 20:
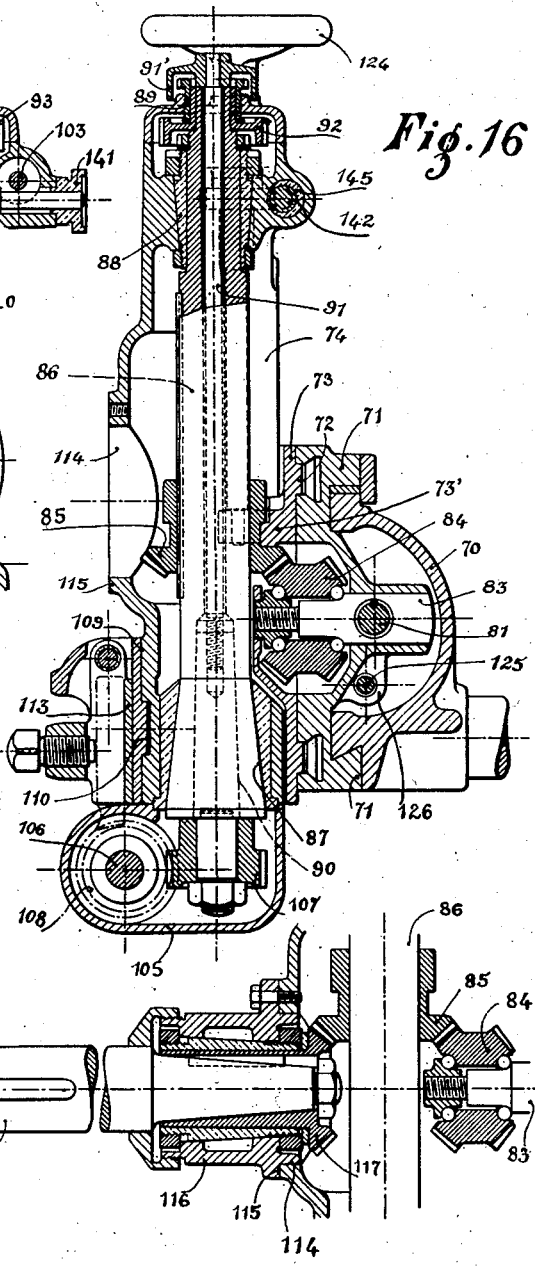

Figure 20 shews the method of mounting of the mortising device.

Figure 21:
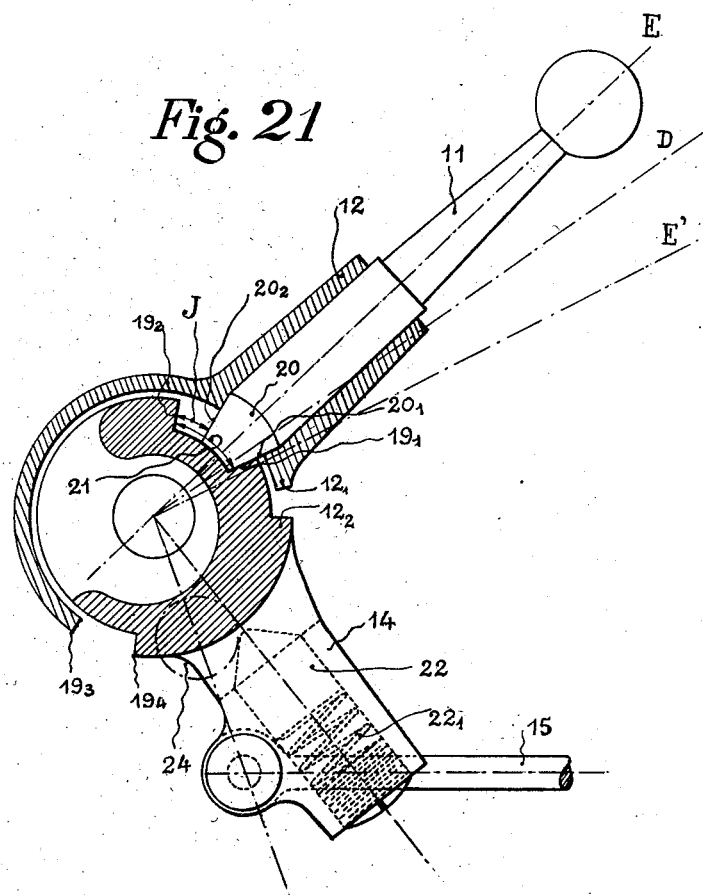

Figure 21 is a horizontal section according to lines $x$—$x$ of Figure 1 of the mechanism of changing the direction of travel as indicated in Figures 2 and 3.

The machine described in the aforesaid Letters Patent comprises a column mounted on a framing supporting a vise intended to hold the work to be machined. The whole of the machine can therefore be adjusted in height and oriented in all necessary directions.

According to the present invention the aforesaid column indicated at 5 is advantageously employed for mounting thereon the single block device. The device for working with the aid of a motor comprises a casing 1 of cast iron having a sleeve 2 whereby the said casing can be adjustably secured to the column 5. The casing 1 is provided with a boss 3 bored and screw threaded to receive a correspondingly threaded spindle 10 by the manipulation of which the height of the machine can be adjusted; the spindle 10, instead of being placed to the rear of the column as before, is now placed in front thereof.

The longitudinal alternating motion transmitted to the tool heads by means of the device controlling the shaping work mentioned above, is obtained in the following manner; a screw spindle 35 disposed in the casing forming a single bloc, by means of roller bearings R and $R_1$ constituting at the same time abutments (Figure 4) can be turned in both directions, owing to the action of conical wheels 6 and 7 receiving alternately their motion from the controlling pulley 9 through the medium of a claw coupling 4 displaced accordingly on the controlling shaft 162; the screw 35 turns in a nut 34 connected with the tool-head by means of rods 26 and of a crossbar 31, to which parts the tool head is attached.

Hence this screw displaces itself longitudinally, with the tool-heads and controls their different speeds of the working stroke and of the return-stroke.

The working stroke at reduced speed is ensured owing to the engagement of the conical wheels 6 and 6' with the sleeve 4.

The backward stroke at accelerated speed is obtained owing to the engagement of the bevel wheels 7 and 8 with the same sleeve 4.

The claw-sleeve 4 is controlled either automatically or by hand; it can be coupled with said bevel wheels at any point of the stroke of the tool, by means of a system of levers described further on.

The claws of the sleeve 4 are so called wolf's teeth permitting an easy and rapid coupling. The displacement of this sleeve on its controlling shaft 162 ensues owing to the action of a lever 13 the articulation whereof $13_1$ is provided in a support $13_2$ (Figure 3). To the lever 13 is fixed another lever 12 keyed on the axle of the first one and carrying a handle 11 sliding in a radial direction. This handle serves on the one hand, for the automatic control of the uncoupling action and, on the other hand, for controlling, by hand, the stopping or starting of the device.

Between the levers 13 and 12 is placed, on the common shaft $13_1$ a third lever 14 serving for automatic coupling and uncoupling and turning independently of said levers and of their common support.

This lever 14 is connected to a rod 15 carrying abutments 28—28' and springs 27; furthermore abutments $19_1$—$19_2$—$19_3$— and $19_4$ (Figure 21) are provided on the same as well as a pointed piston 22 pushed by a spring $22_1$ against a roller 24 disposed in the support $13_2$; the mode of operation of these elements will be defined hereafter.

The working is as follows:

Supposing that the machine is effecting the cutting work, then the claw-sleeve 4 is, at this moment, engaging the claws 17 of the pinion 6, while the lever 12 as well as the handle 11 are in the position of coupling E (Figure 2).

The handle 11 is pushed and maintained in the direction against the centre, and its oblique extremity 20 engages the recess 21 (Figure 21) of the lever 14 in order to form there an abutment; at this moment the lever 14 occupies the position indicated in the drawing and the walls $19_1$ of the recess 21 of this lever 14 is in contact with the inclined walls $20_1$ of the abutment 20 of the handle 11, while the other walls $20_2$ and $19_2$ of the recess 21 and of the abutment 20 are separated by a predetermined play J. If the tool acts, at the end of its stroke, through the medium of the abutment 16 on the adjustable abutment 28, the rod 15 carrying the latter abutment will displace angularly the lever 14. The face $19_2$ of the recess 21 carrying said lever 14 will now touch the face $20_2$ of the abutment 20 of handle 11 after passing through play J.

During this period of the angular stroke of the lever 14, representing the half of the total stroke of the latter, the pointed piston 22 of the lever 14 arrives on the upper dead point of the roller 24, viz, on the point corresponding to the end of one half of the stroke where its axis and the radial axis 30 of the roller 24 are coinciding (Figure 2).

During this time the sleeve 4 has remained always in engagement with the bevel wheels for cutting motion and its levers did not change their position.

At the very instant of the end of the half angular stroke, the pointer 22 acting owing to its spring $22_1$ furthermore the one of the spring of the abutment 27 and to the inertia of the moving parts, glides with its inclined part on the roller 24 and causes a rapid rocking motion of the lever during the remaining angular half stroke, said lever taking along the levers 12, 14, 13 so that the sleeve 4 becomes disengaged from the claws 17 and ready for a new engagement with claws 19 for the backward motion.

The foregoing remarks elucidate the importance of the pointer 22 and of the roller 24 as well as of the abutment-spring 27 these parts having the purpose to ensure the rapid passage of the sleeve from one engagement-position into the other without fear of stopping at the dead point, namely the intermediate point where this sleeve is uncoupled.

The control by hand of coupling for shaping is effected as has been said above, by means of the handle 11 constituting, when towards the center, with its oblique extremity 20 a coupling bolt for the automatic motion.

In order to stop the machine, it will suffice to free this abutment 20 or the coupling bolt, namely to bring this handle during run into the position of uncoupling D (Figures 2 and 21).

A simple pull on the handle causes, as has been said, the stopping of the machine, at the end of the stroke only, owing to the action of the supplementary abutments $19_3$—$19_4$ of lever 14 and $12_1$—$12_2$ of lever 12, the lever being brought at the same time automatically together with its handle into the position of uncoupling D.

In order to maintain the handle 11 in one of its final positions, namely towards the center, if the run is automatic, and towards the exterior, if the machine is to be stopped, balls $31^a$ are provided engaging partially owing to a push exercised by a spring, into one of appropriate recesses $32^a$, $33^a$.

The mechanism intended to permit the shaping with aid of a motor and also the support carrying the said mechanism are so constructed as to permit the control of the shaping by hand as described with regard to the former machines, yet the means being provided below the flange 31 instead of above the same.

These parts, together with their ball bearings and ball abutments R and R' are constructed and arranged as to permit of their rapid disassembling for their control or removal (or exchange by pieces destined solely for the control by hand).

In Figure 7 two helicoidal pinions are represented, the one whereof 36 is fixed by a screw with a safety pin to the axle of the screw 35 while the other pinion 37 is arranged on a removable axle 38 mounted in a sleeve 39 and receiving the motion from the exterior by means of a suitably fastened lever or the like.

These pieces are of no importance for the shaping or planing work but they are utilized for the counter-sink-operations, for sawing, and so on, which operations necessitate an automatic advance derived from the planing screw.

The automatic advance for planing is secured, as in the former machine, at the end of the tool-stroke by means of the rod 41 connected to a ratchet system of the transverse motion and of adjustable abutments 43 on said rod 41 which slides in a support 42 provided on the support of the single block device.

For controlling by hand the planing work, care must be taken to unscrew the nut 34 of the bracket 31 in order to disconnect the bracket 31 from the screw 35. In order to complete the dispositions forementioned the execution can be modified in such manner that to the two tool-head described with regard to the former machine (planing head and grinding, sawing, counter-sink-head and so on) one single head is substituted comprising all necessary working and controlling means for the different operations. Provision is equally made for the control of the different tools from a transmission actuated by the planing device formerly referred to, and for the necessary automatic advances, each tool being nevertheless adjustable by hand, independently of the automatic movement applied to the same.

In such case (Figures 8 and 9) the machine comprises, as formerly, an iron support 1 with a fastening sleeve 2 for fixing on the column 5 of the machine, a screw 35 receiving its motion of rotation alternatively in the one and in the other direction, at different speeds, by means of two conical wheels 6 and 6', and 7 and 8 coupled by means of a claw clutch 4 keyed on a shaft actuated by a step pulley 9.

The axle 55 shows at its other extremity a recess serving for lodging therein a key 59 movable around an axis and pushed constantly against the exterior by a spring 60. This key passing into the groove 54 of the sheath 53 is taken along owing to the rotation of this sheath and fixes at will one of the pinions 61, 62, 63, 64, 65, 66 loosely mounted on the sleeve and constituting the primary gearing for variation of speed. The secondary gearing is formed by a series of corresponding pinions 67 engaging constantly the primary gearing and keyed on a sleeve 68 mounted on bearings. The interior of this sleeve, which is grooved, serves to guide a shaft 69 provided with a key and taken along by the sleeve during its rotary motion. The variation of speed is obtained very simply by acting on the knurled button 58 actuating the axle 55 in the one or in the other direction and fixing, by means of the key 59, one of the pinions of the primary gear to the sleeve 53 and securing thereby the desired corresponding speed. The whole is placed into the interior of a support 163 connected to the support of the planing device.

The combined control of the shaping tool-head hereinbefore mentioned comprises the following arrangement. The shaft 162 carrying the stepped pulley 9 carries at its opposite end a bevel gear-wheel 51 which actuates a bevel gear-wheel 52 keyed on a sleeve 53 mounted on balls. In the interior of the sleeve 53 which is grooved as at 54, is an axle 55 terminating at its one end in a circular rack 56 which engages a pinion 57 controlled from the exterior by means of a knurled button 58, Figures 8 and 9. The axle 55 at its other end is recessed to receive a key 59 movable around an axis and constantly forced outward by a spring 60. The key 59 extending into the groove 54 of the sleeve 53 is displaceable owing to the rotation of the said sleeve and can thus secure at will one of a number of pinions 61, 62, 63, 64, 65, 66 loosely mounted on the sleeve 53 and forming the primary gearing for variation of speed. The secondary gearing is formed by a corresponding number of pinions 67 constantly engaging the primary gearing and keyed on a sleeve 68 mounted on balls. The interior of the sleve 68, which is grooved, serves to guide a shaft 69 provided with a key and displaceable with the sleeve during its rotary motion. The variation of speed is obtained very simply by acting on the knurled button 58 which actuates the axle 55 in the one or in the other direction and thus locks, by means of the key 59, one of the pinions of the primary gear to the sleeve 53, thereby securing the desired corresponding speed. The whole is disposed in the interior of a casing 163 connected to the casing of the planing device.

The controlling mechanism comprises in such case a group of three controlling pinions 166, 167, 168 and three receiving pinions 169, controlled from a pulley 165. The receiving pinions are keyed on a shaft 162' carrying the claw clutch 4. The axle 55' of the primary gearing has a lodging for a key 59' movable around an axis and pushed constantly outwardly by a spring 60'. This key passes into a groove 54' and fixes at will one of the pinions 166, 167, 168 of the primary gears, which are mounted loosely on the shaft 55'. The variation of the speed is obtained by handling a knurled button 58' keyed on a rod 170, the threaded extremity whereof is screwed into a nut 171 controlling the translation of the rod 172 carrying the axle of the movable key 59'.

On the axle of the planing screw 35 glides a loose gear, the pinions 173, 173' whereof can engage each of the intermediate wheels 174, 174' (Figures 10 and 12). These intermediate fixed pinions 174, 174' transmit the motion to a shaft 175 which is telescopic and which controls the tool-head. A second gear with loose wheels 176, 176' is arranged on said shaft 175.

The gear 173, 173' is operated from the exterior by means of the knurled button 177, rod 177', pinion 178, circular rack 179 carrying the fork 180.

The gear with pinions 176, 176' is operated by means of the knurled button (not shown in the drawings), rod 181, circular rack 183 and controlling fork 184.

The buttons controlling the key 59' and the two forementioned gearing systems are arranged in the same line, in order to facilitate the handling of the device for transmission of motion.

This mode of execution provides a very wide range of speed variations.

The first box for variations of speed by means of pinions and of a movable key may also be replaced by the gearing comprising loose pinions, as specified above.

In the following descriptional part the employment of a single speed box with a movable key will be supposed, as described in the first example.

The sliding shaft 69 controls the different mechanisms of the tool-head, independently of the position of the head with regard to the column of the machine.

In the former machine the sliding arms 26 and 27 carry at their extremity a circular disc on which is mounted the one or the other of the two provided heads. Instead of this disc, according to the present invention a long beam of appropriate section 70 is provided, with a dove-tail groove, and on this beam glides in the longitudinal direction a support 71. This support comprises a circular part 72 permitting the mounting of a disc 73 and its adjustment in any desired angle. This disc has a dove-tail groove in order to permit there the gliding of the tool-head referred to later on.

At one extremity of the beam 70 (Figures 8 and 9) is provided a support 75 connected to the beam and taking up one extremity of a shaft 69 on which is keyed a bevel wheel 76 engaging the pinion 77. The latter is keyed on an axle 78, as well as a straight pinion 79 engaging a second pinion 80 actuating the shaft 81. This shaft grooved in its whole length is disposed longitudinally in the interior of the beam 70 and drives a bevel wheel 82 mounted in a bearing in a compartment provided in an extension of the support 71; hence the pinion follows all displacements of the support while sliding on the shaft 81.

An axle 83 is located in the support 71 and a bevel wheel with double toothing 84 is mounted on said axle, the one series of teeth engaging a pinion 82 and the other series of teeth engaging the pinion 85 (Figures 14, 16, 19). In the boring of the pinion 85 can slide the main shaft 86 of the tool-head, the shaft and the pinion being connected by means of a key. The pinion 85 engages constantly the pinion 84 owing to an extension forming the half of a collar 73' connected to the disc 73 and penetrating into a circular groove provided for this purpose in the hub of the pinion 85.

From the foregoing it will be understood that the control of the main shaft of the tool-head is effected by means of the sliding shaft 69, bevel gear 76, 77, axle 78, straight pinions 79, 80, of the cross shaft 81 and the bevel wheel-system 82, 84 and 85.

The main shaft 86 (Figure 14) of the tool-head is mounted in the manner of the counter sink shafts with a cone 87, sleeve 88 for compensating the play and an adjustable abutment 89. It comprises in its lower part a cone 90 for the reception of the countersinks and is pierced in a manner to receive a rod 91 threaded in its lower part and provided with a knurled button 91' (Figure 16) at its upper part, the said rod serving for the fixation of the counter-sinks.

All motions necessary for different operations are originated on the main shaft. For this purpose a pinion 92 is keyed at its upper extremity, this pinion engaging an intermediate pinion 93 keyed on an axle 94 and actuating a pinion 95. The pinion 95 slides on a sleeve 96 and drives the same by means of a key. In the boring of the sleeve provided with a groove for the key, slides a shaft 97 parallel to the main shaft and provided with a driving key and destined for the boring operations. The device adopted is the one of the sensitive boring machines, with a sleeve 98, rack 99, pinion 100 controlled by a hand-wheel 101. The boring device can be coupled or uncoupled, at will, by means of the following mechanism: On the hub of the pinion 95 is provided a groove into which engages a little roller 102 mounted on a pin eccentric on the axle 103 which can be moved by means of a knurled button. By turning the button in the one or in the other direction, and consequently also the roller, the pinion 95 is caused to move from its upper towards the lower position or from its lower towards its upper position on the sleeve 96 and hence engage or disengage the pinion 93. A step-pulley 104 is also provided at the upper extremity of the shaft 97 in order to effect boring operations at great speeds directly and independently.

At the lower part of the tool-head an adjustable support 105 may be provided on the support, the axis whereof is horizontal and in the interior whereof is located a shaft 106. This shaft receives its motion from the main shaft 86 by means of two helicoidal pinions 107 and 108, the pinion 107 being mounted on the main shaft instead of the countersinks and the pinion 108 on the horizontal shaft 106. This shaft can carry at each of its extremities either a circular saw or a counter-sink, a grinding stone, a polishing wheel so as to permit the execution of counter-sink work, of cutting of teeth and racks, of sawing, grinding and so on. In case of operations needing a great velocity, such as grinding, rectifications, polishing, the one of its extremities can receive a step-pulley 159 in order to actuate the shaft directly by means of belts.

An analogous device, represented in Figure 18 is also provided to be mounted instead of the one just described. It composes itself of a support 105' with a horizontal shaft 106' actuated by pinions 107' and 108', the first being mounted on the main shaft and the second one on the horizontal shaft. The horizontal shaft has one head only with a female cone destined to receive the countersinks or their holder 149; it is bored in a manner to receive freely a rod 150 threaded at one extremity and provided outwardly with a head with six faces for handling this rod being destined to assure the fixation of the counter-sinks or their holders.

It is to be understood that for all operations needing the utilization of the main shaft or of the boring device, either for planing, or mortising or boring operations referred to later on, the support is removed from the head.

In the front and at the lower part of the tool-head is provided a circular part 109 (Figures 13 and 16) with a central recess 110, arranged to receive the planing system composed of an adjustable sole 111 fastened by means of two screws 112 and a part 113 pivoting around an axis and receiving the tool fixed by a screw.

Above the same a bored opening 114 is provided having a planed surface at 115 and three bossages with threaded holes at 160. This opening is destined to receive all broaching or mortising devices.

The broaching or counter-sink device (Figure 16) is constituted by a support 116 to be mounted on the opening 114 and provided with a system for compensating the conical play as well as with a pinion 117 which is conical and arranged to actuate the boring bar 118. The height of the tool-head is regulated in such manner that the pinion 117 engages the pinion 85 of the main shaft imparting its motion to the pinion. The broaching rod can be guided by means of a collar-plate fixed to the table of the machine; its longitudinal motion of automatic advance is the one imparted to the tool-head.

Instead of the broaching or counter-sink device a slotting device (Figure 29) can be mounted, this device being constituted by a support 119 carrying a mortising rod 120 equipped at its extremity with an adjustable holder 121 receiving the tool. This device is arranged for the working of grooves, on pulleys, bushes, hubs and so on, its to-and-fro motion, the adjustability of its stroke being obtained by means of the devices provided for planing.

It has been said above that the support of the tool-head glides in the disc 73 by means of a dove-tail (Figures 14 and 16 and that on the other hand it can be adjusted to a certain angle with the vertical line owing to the mounting of the disc on the support 71. The descending and ascending motion of the tool-head, permitting the adjustment of the tool for planing, broaching, milling, grinding and so on with regard to its height and also the working in depths for some operations, is obtained in the following manner: The half-collar 73' connected to the disc 73 forms a bossage to which is fixed immovably a vertical threaded rod 122 (Figure 14) engaging at the upper part a threaded sleeve 123 rotatable by means of a hand wheel 124 but not displaceable in the longitudinal direction. It will be readily understood that according to the sense of rotation imparted to the hand wheel the sleeve will progress in the one or in the other direction, along the screw which is kept immovable, and will actuate owing to its displacement the tool-head. It will be seen further on, that this motion can be rendered automatic. The devices for an automatic advance, provided for the new tool-head, for the transverse advance and for the vertical advance, are realized in the following manner:—For the transverse advance a screw 125 (Figures 16 and 13) is disposed longitudinally in the beam 70 and below the shaft 81 (Figures 9 and 13). This screw traverses a threaded bossage 126 connected to the support 71 and, owing to its rotation, actuates the support 71 in the one or in the other direction, and hence also the head carried by the support. The motion is received from the screw in the support 75 (Figure 9) by means of a toothed roller 127 sliding on an axle 78 wherewith it is connected by means of a key. This toothed roller is displaced by means of a pin 128 penetrating into a groove provided in the hub of the roller, this pin being placed eccentrically on an axle 129 moved by a knurled button 130. This toothed roller 127 can be brought into engagement with any one of the concentric rows of teeth of a disc 131 mounted at the end of a shaft 132 (Figure 8) with an endless screw 133 engaging a helicoidal pinion 134 actuating the screw 125. The shaft 132 turns in the interior of an eccentric sleeve 135 which can be rotated by means of a knurled button 136. The eccentricity of the sleeve permits by simple rotation the engagement between the screw 133 and the pinion 134, producing thereby the disengaging of the screw 126 whilst the displacement of the toothed roller in front of the disc changes its speed and reverses the motion. The movement of the screw 125 can be also obtained by hand by means of the hand wheel 125'.

The vertical advancing motion of the tool-head is obtained in a similar manner. The shaft 94 actuated by the pinion 93 (Figures 15 and 17) assures, by means of a key, the toothed roller 137 provided with a circular rack 138 permitting its displacement in front of a disc 139 having concentric rows of teeth, by means of a pinion 140 (Figure 15) controlled by a knurled button 141. The disc 139 drives a shaft 142 provided with an endless screw 143 engaging a helicoidal pinion 144 keyed on a threaded sleeve 123. The rotation of the pinion causes that of the sheath and hence the displacement of the tool-head. The shaft 142 turns in an eccentric sleeve 145 which can be rotated by means of a knurled button 146. Hence by partly turning said sleeve the screw 143 on said shaft may be engaged with or disengaged from the helicoidal pinion 144. It is possible to provide for the same purpose a threaded pin 147 engaging a helicoidal path 148, moving along the same and displacing the shaft 142, the disc 139 being thereby separated from the toothed roller 137. The displacement of the roller in front of the disc with concentric rows of teeth provides a variation of the advancing speed.

It is to be understood, that besides the automatic advances described above advances can be secured also by means of triggers or the like, for example in the simple form of the application to the extremity of the beam or the like 70, of the device described with regard to previous machines. Such advances by means of triggers or the like can be substituted to the other advancing mechanisms for planing, mortising and other operations.

Finally, it is obvious that the controlling by hand can be substituted to the working by a motor, simply by replacing the step-pulley 9 (Figure 9) by a fly-wheel provided with a handle.

The pinions between said fly-wheel and the controlling shaft 162 can be established with regard to a certain relation between them.

What we claim, is:—

1. In a universal machine tool, a single tool head having means for the reception of tools for planing, drilling, grinding, sawing, milling, slotting and the like, and also provided with means to feed and move any of said tools to effective position, a single casing, drive mechanism for the planing tool and change gears for revoluble tools also arranged in said casing, sliding rods by which said tool head is carried and a shaft to transmit motion to such tools as may be revoluble, said sliding rods and said shaft being also arranged in said casing.

2. A machine as in claim 1, including a drive pulley, sliding rods by which the tool head is carried and means for converting the rotary movement of the said pulley into reciprocating movement for said rods, said converting means including a clutch coupling gearing and means to render said gearing inoperative when desired.

3. In a universal machine tool, a single tool head having means for the reception of tools for planing, drilling, grinding, sawing, milling, slotting and the like and also having means to feed and move said tools to effective position, a driving pulley, sliding rods by which said tool head is carried means for converting the rotary movement of the said pulley into reciprocating movement for said rods, and a clutch coupling gearing for converting the rotary movement of the said pulley into reciprocating movement for said rods, said gearing including a driving shaft, a clutch movable thereon, a hand lever, a link connecting the clutch with the hand lever, connecting rods connected to said link and reciprocating rods actuated by said connecting rods all arranged for operation by the said hand lever to disconnect the drive mechanism.

4. In a universal machine tool, a single tool head having means for the reception of tools for planing, drilling, grinding, sawing, milling, slotting and the like, means with which said tool head is provided to feed and move said tools to effective position, a single driving shaft, a change gear between said shaft and the tool holder head, a sleeve 53 on which certain of the gears of the change gear are mounted, a key 50 mounted on said sleeve, a spring to press said key outwardly and means operable from the outside of said tool head to adjust said key to engage any desired gear with the drive shaft according to the speed desired.

5. A machine as set forth in claim 1, including a casing 73, 74 of the tool holder head and main shaft 86 disposed vertically in said casing and arranged to transmit the drive to the revolving tools, said casing 73, 74 being horizontally adjustable, a casing 70 in which said casing 73, 74 and said shaft 86 are enclosed, said casing 70 being connected with said sliding rods and drive mechanism of the main shaft arranged in said casing.

6. In a universal machine tool, a single tool head having means for the reception of tools for planing, drilling, grinding, sawing, milling, slotting and the like and also provided with means to feed and move said tools to any position necessary to secure effective operation thereof, a drive transmitting main shaft 86, a drill shaft 97, a detachable shaft 106 for the revolving tools, a tool head 11 for the planing tools and a tool head 114 for the shaper or slotting tools.

7. A machine as in claim 6 in which said tool holder head is transversely movable, a feed shaft 125 is provided to control such movement and is arranged and provided with means whereby it is driven positively in the drive mechanism, and an adjustable casing 70 in which said feed shaft is arranged.

8. In a universal machine tool, a single tool head having means for the reception of tools for planing, drilling, grinding, sawing, milling, and also provided with means to feed and move said tools to any position necessary to secure effective operation thereof, a drive transmitting main shaft 86, a drill shaft 97, a detachable shaft 106 for the revolving tools, a tool head 11 for the planing tools and a tool head 114 for the shaper or slotting tools, said tool holder head being transversely movable, a feed shaft 125 provided to control such movement and arranged and provided with means whereby it is driven positively in the drive mechanism, and an adjustable casing 70 in which said feed shaft is arranged, said means for driving the feed shaft comprising a disc having concentrically arranged teeth, a worm gear engageable with said teeth at will to vary the speed of the feeding movements at will.

9. A machine as in claim 8 including a wheel having a threaded sleeve on which it is mounted, said wheel being operated by said worm, and being movable therefrom, and in which said tool head has a platform provided with a stationary threaded spindle on which said threaded sleeve is mounted so that by turning the platform the sleeve moves along the spindle carrying the tool holder head therewith.

In witness whereof we affix our signatures.

MARCEL SCHWOB.
ALEXANDRE SCHWOB.